United States Patent [19]

McKillip

[11] Patent Number: 5,283,432

[45] Date of Patent: Feb. 1, 1994

[54] OPTICAL CONTROL KNOB ASSEMBLY INCORPORATED ON A FLAT PANEL DISPLAY APPARATUS

[75] Inventor: Robert C. McKillip, Cedar Rapids, Iowa

[73] Assignee: Rockwell International Corporation, Seal Beach, Calif.

[21] Appl. No.: 947,228

[22] Filed: Sep. 18, 1992

[51] Int. Cl.⁵ .............................................. G01D 5/34
[52] U.S. Cl. .................................. 250/229; 250/214 PR
[58] Field of Search ..................... 250/214 PR, 229; 340/713, 718, 765, 766

[56] References Cited

U.S. PATENT DOCUMENTS

| | | | |
|---|---|---|---|
| 4,379,255 | 4/1983 | Klose et al. | 250/214 PR |
| 4,554,451 | 11/1985 | Kirstein | 250/214 PR |
| 4,906,846 | 3/1990 | Arimura | 250/229 |
| 4,928,008 | 5/1990 | Huggins et al. | 250/214 PR |
| 5,177,355 | 1/1993 | Branan, Jr. | 250/229 |

Primary Examiner—David C. Nelms
Assistant Examiner—S. B. Allen
Attorney, Agent, or Firm—Kyle Eppele; M. Lee Murrah; H. Fredrick Hamann

[57] ABSTRACT

A control knob assembly primarily for use with devices utilizing flat panel display technology, each assembly having means for manipulating the electronic apparatus by using remote sensing capability to transfer control knob input into a control signal. The assembly is mounted on a bezel, affixed to the front side of the flat panel display and cooperates in conjunction with a plurality of photodiode devices located near the back side of the flat panel display. Photodiodes are located with respect to knob location so as to be able to detect knob adjustment by monitoring a reflected signal that is alternatively disrupted by knob adjustment. The photodiode devices may be infra-red light emitting diode as are well known in the prior art. Circuitry to the photodiode device is used to transmit detected knob adjustment to the appropriate device control circuitry.

8 Claims, 1 Drawing Sheet

OPTICAL CONTROL KNOB ASSEMBLY INCORPORATED ON A FLAT PANEL DISPLAY APPARATUS

BACKGROUND OF THE INVENTION

The invention relates to flat panel displays, and more particularly to control knob apparatus for equipment utilizing such flat panel displays.

Flat panel displays are widely used in applications where the depth dimension of a cathode ray tube is determined to be excessive. Space considerations are also often critical with respect to the available surface area to be used by the apparatus having a flat panel display. Control knobs for adjusting equipment utilizing flat panel technologies are located at the periphery of the flat panel display given the operating principles of flat panel technology.

As a means of illustration, but not limitation, high level operational theory of Liquid Crystal Displays (LCDs), one type of flat panel technology is provided. Such displays are typically constructed of rectangular surface dimensions. Customizing specific flat panel display surface geometrical designs for low to moderate volume production runs can be prohibitively expensive.

The principle of operation of LCD's is well known in the art but for purposes of understanding the background of the present invention, it can be stated that LCD's operate by reducing the transmissibility of light through a thin layer of a liquid crystalline material when an electric field is applied. Since the effect is localized, shapes and characters can be drawn on an LCD by carefully controlling the application of the electric field. Unlike cathode ray tubes which LCD's are replacing, LCD's are not self-illuminating. This does not normally affect daylight use, but under night or other low light level conditions some sort of backlighting is required in order for LCD's to be viewed. Very high brightness ambients also require additional backlight brightness to maintain readability.

One area that has found widespread acceptance of instrumentaion having flat panel displays is the field of avionic equipment. Although not constrained to avionic LCD applications the present invention will be described in terms of such usage. It is understood that the teachings of the present invention are not limited to avionic LCD applications but may be utilized by any flat panel display.

To place cable wires or other means of conduit connecting a control knob located on the screen periphery to control means within the subject equipment requires limiting LCD dimensions in order to accomodate the hard wiring to the knob. Side mounting of the knob is generally not available because of the location of immediately adjacent equipment having display in the same geometrical plane as the flat panel display of the subject equipment. Similarly, location of control knobs at some location away from the subject equipment creates confusion, safety concerns and logistical problems connecting the control knobs to the appropriate control circuitry or devices.

Thus, a need exists for maximizing the surface area of the flat panel display while maintaining peripherially located control knobs for the associated equipment.

SUMMARY OF THE INVENTION

A control knob apparatus utilizing remote sensing capability to transfer control knob input into a control signal. The control knob is mounted on a bezel and affixed to the front side of a flat panel display and cooperates in conjunction with photodiode devices located near the back side of the flat panel display. The photodiodes are located with respect to control knob location so as to be able to detect knob adjustment by monitoring a reflected signal that is alternatively disrupted by knob adjustment. The photodiode device may be any suitable wavelength light emitting device such as an infra-red LED as is well known in the prior art. Circuitry coupled to the photodiode device is used to transmit detected knob adjustment to the appropriate apparatus control circuitry.

It is therefor an object of the present invention to provide an apparatus for maximizing surface of equipment utilizing flat panel technologies.

It is a feature of the present invention to provide a a control knob for use with flat panel technology equipment having remote sensing capability.

It is an advantage of the present invention to provide an apparatus utilizing flat panel technology in combination with a plurality of control knobs.

These and other objects, features and advantages are disclosed and claimed in the specification, figures and claims of the present application.

DETAILED DESCRIPTION OF THE DRAWINGS

Figure 1:
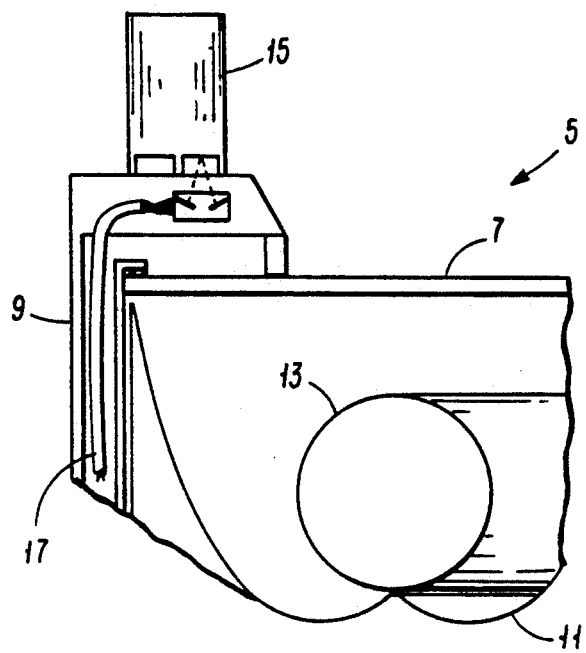
FIG. 1 is a cross sectional view of an apparatus having a flat panel display and a control knob as known in the prior art.

Referring now to the drawings wherein like items are referenced as such throughout, FIG. 1 illustrates a cross-sectional view of an apparatus 5, utilizing a liquid crystal display 7 for viewing apparatus measurements. A bezel 9, engaging and retaining LCD 7 securely in place is located at the outer edge of the front surface of apparatus 5. Apparatus 5, is comprised of a multi-walled container 11 for supporting a flat panel display 7. Display 7 provides visual data for one to view and react to from input signal received from instrumentation not shown. A tubular fluorescent bulb 13 is encased within multi-walled container 11 and serves to illuminate display 7. A control knob 15 is shown mounted to bezel 9 and accordingly at an extreme edge of display 7. Knob 15 is coupled to control circuitry not shown via wires 17. Wires 17 transfer input via knob 15 in order to adjust or otherwise control apparatus 5.

The prior art described above illustrates the limitations of current method of using control knobs on flat panel display surfaces. In order to maintain the integrity of the flat panel display 7, the conduit for coupling the knob 15 to instrumentation control means are cables 17 and must be located near or routed through the peripheral of display 17. Routing of cable 17 beyond the bezel 9 and into apparatus 5 through a side wall 11' of multi-walled container 11 is precluded by the adjacent placement of additional instrumentation, the performance degradation and poor reliability due to wire 'nicking', shorting, etc. a serious producability problem of forming such a connector path for cable 17 during the manufacturing process.

Figure 2:
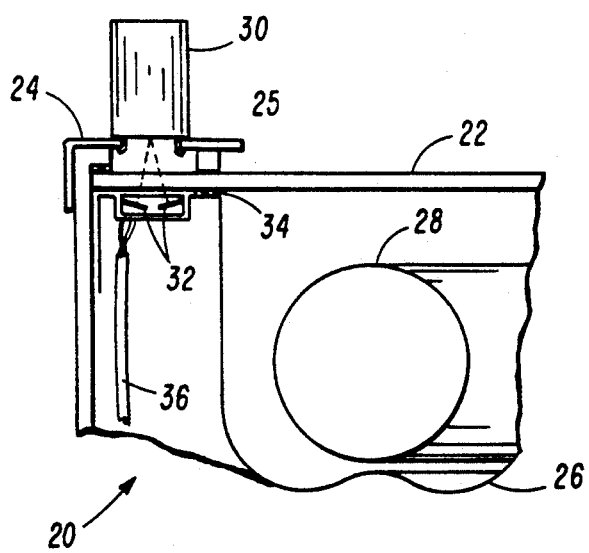
FIG. 2 is a cross-sectional view of one embodiment of an apparatus having a flat panel display and incorporating the present invention.

FIG. 2 illustrates an apparatus 20 utilizing a flat Panel display 22 for visually delivering monitored data to one using apparatus 20. Similar to the apparatus described in FIG. 1, a bezel 24 for securing flat panel 22 as a top member to multi-walled container 24 is utilized. A fluorescent bulb 28 is located within multi-walled container 26 and serves to provide illumination to display 22. A control knob 30 is located over flat panel display 22. A pair of photodiode sensors 32 is located within a recessed portion of multi-walled container 26 that is shielded from backlight illumination with gasket material 34. Wiring 36 couples photodiode sensed input to control means (not shown) of apparatus 20.

Construction techniques of apparatus 20 is consistent with principles used in fabricating devices of the prior art. The photodiode sensors are rigidly mounted into place in container 26 with the use of any commercially available epoxy adhesive. Control knob assembly 30 is held in place by an annular shaped protrusion 31 located on the surface of the knob in contact with bezel 24 that extends through an opening 25 in the bezel of such dimensions to cooperate with the knob protrusion 31 so as to secure the control knob assembly to the bezel. The bottom surface of control knob 30 is coated with alternating reflective and absorptive stripes. The alternating passage of these surfaces over the photodiode sensors provides the ability to sense both rotation and direction. Control knob assembly 30 may be constructed in such manner as to provide knob movement incremental measurements through a calibrated system of allowing a directed light beam to pass towards photodiode sensors 32. Optek Technology, Inc., 1215 West Crosby Road, Carrollton, Texas currently offers photodiode detector devices suitable for use with the present invention.

Figure 3:
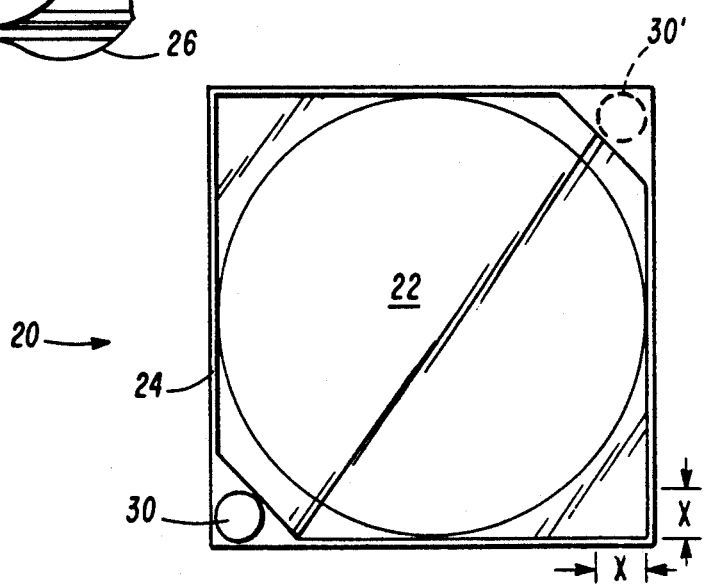
FIG. 3 is a top plan view of the apparatus of FIG. 2.

FIG. 3 illustrates a top plan view of the apparatus of FIG. 2 incorporating the teachings of the present invention. Flat panel display 22 is circumscribed by bezel 24. As shown one corner of the front surface of apparatus 20 has its overlaying bezel increased in size in order to accomodate a control knob assembly 30. It is understood that although illustrated in one corner, control knob assembly location may be arbitrarily decided by apparatus 20 manufacturer and may be a plurality of control knob assemblies so as to include a 30', shown in dashed lines. The entire length of the surface area of display 22 represented by width arrow X represents increased display size over apparatus using flat panel displays with hard wired control knobs of like overall surface dimensions.

While particular embodiments of the present invention have been shown and described, it should be clear that changes and modifications may be made to such embodiments without departing from the true scope and spirit of the invention. It is intended that the appended claims to cover all such changes and modifications.

I claim:

1. A control apparatus for a device having a viewed flat panel display integrally encompassing the flat panel display comprising:

means, located on the viewed surface of the flat panel display, for converting inputs into optical signals; and means, located on the back side of the flat panel display, for monitoring, interpreting and coupling the optical signals to control circuitry of the device.

2. The apparatus of claim 1 wherein the optical signals are within the infrared wavelength range.

3. The apparatus of claim 1 wherein the means located on the back side of the flat panel display is a pair of photodiode sensors.

4. The apparatus of claim 1 wherein the flat panel display is a backlighted liquid crystal display.

5. A rotary control knob apparatus for use with a device utilizing a flat panel display screen having a viewed surface, the control knob apparatus integrally encompassing the flat panel display and comprising:

actuable means, located on the viewed surface of the flat panel display, having an adjacent surface that include an optical pattern for converting user inputs into optical signals;

first means located on the back side of the flat panel display for emitting an optical signal in the direction of the actuable means; and second means, located on the back side of the flat panel display, for monitoring and interpreting the reflected optical signals.

6. The apparatus of claim 5 wherein the optical signals are within the infrared wavelength range.

7. The apparatus of claim 5 wherein the first and second means located on the back side of the flat panel display is a pair of photodiode sensors.

8. The apparatus of claim 5 wherein the flat panel display is a backlighted liquid crystal display.

* * * * *